3,277,529
MANUFACTURE OF LINERS FOR DOUBLE
BARREL EXTRUDERS
David W. Linder, East Brunswick, N.J., assignor to International Rectifier Corporation, El Segundo, Calif., a corporation of California
Filed Dec. 9, 1963, Ser. No. 329,160
3 Claims. (Cl. 18—12)

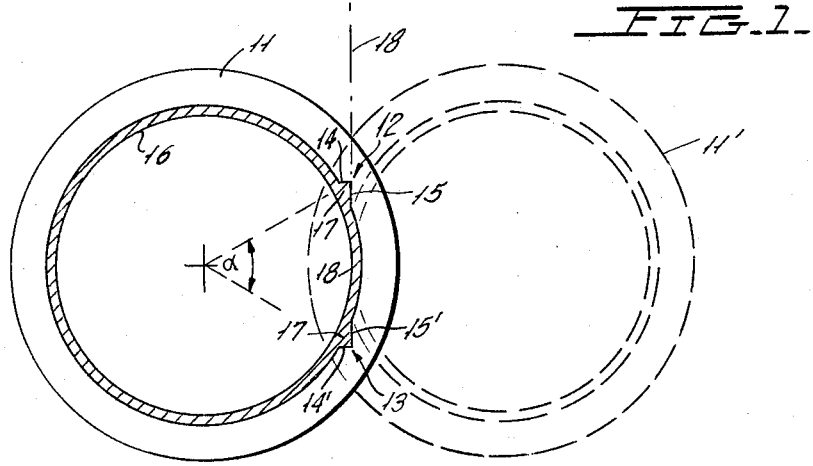
FIG. 1
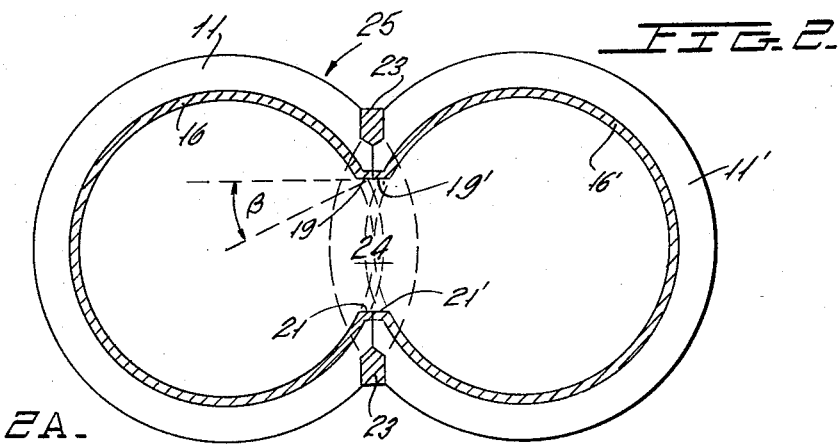
FIG. 2
FIG. 2A
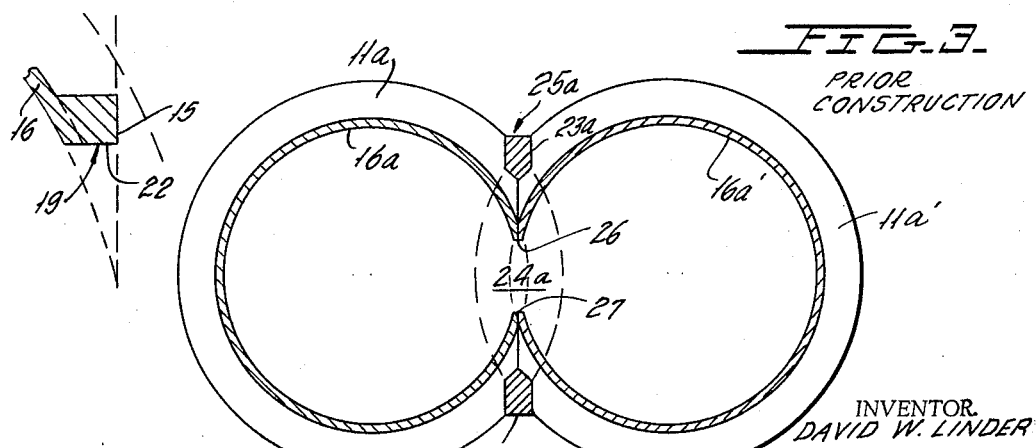
FIG. 3
PRIOR CONSTRUCTION
INVENTOR.
DAVID W. LINDER
By
OSTROLENK, FABER, GERB & SOFFEN
ATTORNEYS

United States Patent Office 3,277,529
Patented Oct. 11, 1966

The present invention relates to the manufacture of parts for, and finished liners for double-barrel extrusion apparatus, and more particularly to a method for manufacturing such elements and to the resulting improved elements themselves.

It is known to manufacture double-barrel extruders used in the processing of thermoplastic materials, employing liners formed by welding together segments of tubular bodies, the interior walls of which segments are provided with a wear-resistant metallic lining to resist the high pressures developed by the materials extruded therethrough. One such double-barrel extrusion apparatus is described in U.S. Patent No. 3,010,151, granted on Nov. 28, 1961.

Apparatus manufactured as described in the aforesaid patent is subject to a number of disadvantages.

The V-shaped apices defined by the thin wear-resistant linings of the tubular segments of such apparatus define a relatively narrow intermediate section therebetween; the size of such section, in turn, determines the dimensions of the central opening between the liner segments, since the wear-resistant material must provide an inlay bordering such central opening. Hence, the width of the central opening between the tubular segments of the extruder liner is narrowly dependent upon the dimensions of the individual segment linings and is, in any case, quite small relative to the diameters of the respective segments. Such restricted openings frequently result in the production of high pressures on the outer sides of the liners and consequent scoring thereof. In addition, such restricted openings do not allow proper flow of the extruded materials from one barrel segment to the other and result in relatively poor machine efficiency.

Moreover, the V-shaped apices provided in conventional liners for double-barrel extruders are relatively weak and, when subjected to excessive pressures, frequently break off.

It is accordingly among the objects of the present invention to provide a liner for a double-barrel extruder, having a longitudinal opening between the tubular segments thereof which can be of any desired width, thereby facilitating high machine efficiencies, the maintenance of uniform pressures distributed across the internal diameter of the liner, and proper flow of the extruded materials from one liner segment to the other.

It is an additional object of the invention to provide such a liner wherein the juncture surfaces between the liner segments have relatively high strengths and are not subject to fracture.

A still further object of the invention is to provide a method for the manufacture of such improved liner and the preformed hollow tubular bodies therefor in a simple and economical manner.

Other objects and advantages of the invention will be apparent to those skilled in the art from a consideration of the following disclosure, including the detailed description of a preferred embodiment thereof taken in connection with the accompanying drawing in which:

FIGURE 1 is a cross-section of a preformed hollow tubular body prepared in accordance with the invention;

FIGURE 2 is a cross-section similar to FIGURE 1 illustrating a liner prepared from a pair of the tubular bodies illustrated in FIGURE 1 and welded together for use in a double-barrel extruder;

FIGURE 2A is an enlarged detail view of a portion of the liner assembly illustrated in FIGURE 2 adjacent the juncture of the two barrel segments; and FIGURE 3 is a cross-section similar to FIGURE 2, illustrating the configuration of a liner for a double-barrel extruder constructed in accordance with the teaching of the prior art.

According to the present invention, a liner for a double-barrel extruder is provided by initially forming a pair of lined tubular bodies, each of which comprises a preformed hollow metallic member lined with a wear-resistant metallic layer having a generally cylindrical configuration and including a pair of spaced ribs extending lengthwise of and inset within the walls of the metallic body. Each of the pair of ribs is defined by a pair of substantially orthogonally directed surfaces, one of the surfaces of each rib being positioned parallel to and in alignment with the corresponding surface of the other rib of each pair.

Upon milling a pair of these tubular bodies lengthwise of and adjacent the spaced ribs, removing the wall portions intermediate the ribs and welding the resulting pair of tubular segments together with the rib elements disposed in adjacent, aligned relation, an extruder liner is produced having a pair of juncture surfaces abutting the passageway between the respective parallel segments thereof, which comprise a relatively strong, smooth wear-resistant layer constituted of the aforesaid wear-resistant material.

The location of the longitudinal ribs formed in the wear-resistant metallic lining layer may be chosen in accordance with the requirements for the extruder liner, thereby permitting the choice of any width of the eventual longitudinal opening between the tubular segments of the liner. The extruder may thus be designed to provide optimum material flow and pressure characteristics to meet any design requirements, and thereby achieve high machine efficiencies.

Referring to the preferred embodiment of the invention illustrated, the extruder liner hereof is produced by initially forming a pair of longitudinally extending notches 12 and 13 in the inner surface of a hollow tubular metallic body 11 (FIGURE 1) for the formation of a wear-resistant metallic lining therein. The notch 12 is defined by a pair of wall sections 14 and 15 disposed substantially at right angles with respect to one another, and the notch 13 by a similar pair of wall sections 14' and 15', similarly disposed orthogonally with respect to one another. The surfaces 15 and 15' of notches 12 and 13, respectively, are disposed substantially parallel to and in alignment with one another, for forming the juncture surfaces of the central liner opening described hereinafter.

The longitudinally extending intersections between the surfaces 14 and 15 and 14' and 15' of the respective notches are so spaced peripherally of the tubular body 11 as to define the size of the desired central opening for the double barrel extruder liner. For most applications it is sufficient for such intersections to be so spaced that the radial angle alpha ($\alpha$), indicated in FIGURE 1, determined by the arc between such intersections is from about 45 to 60 degrees of the tubular cross-section of the body 11.

A wear-resistant metallic layer is thereafter applied as a lining to the inside walls of the body 11, including the volumes subtended by the notches 12 and 13. The water-resistant layer is desirably composed of a metallic alloy suitably constituted to provide desired abrasion-resistance, corrosion-resistance and/or other specific properties. For most applications, when the body 11 is constituted of a ferrous metal, e.g., steel, the wear-resistant alloy has a melting point greater than 1,000° F. and less than the melting point of the body constituent material. Pre-formed slugs of such alloy may be inserted within the body 11 or, alternatively, suitably proportioned amounts of the individual metals which, when melted together, will produce the desired alloy composition, may be charged to the tubular body 11 to form the lining in the manner described hereinafter.

One desirable hard, wear-resistant alloy which may be employed to form the wear-resistant lining is a ferrous alloy consisting principally of iron and containing from about 2.5% to 6% by weight nickel, from about 2% to 4% by weight combined carbon, from about 0.2% to 2.5% by weight boron, up to about 2.5% by weight silicon, up to about 0.1% by weight sulfur and up to about 0.3% by weight phosphorus. The composition of such a hard substantially unmachinable ferrous alloy is more fully described in U.S. Patent No. 2,046,913.

An additional alloy which may be employed for the formation of the wear-resistant lining is a nickel-cobalt alloy containing from about 40% to 45% by weight nickel, from about 40% to 45% by weight cobalt, from about 6% to 8% by weight chromium, from about 3% to 4% by weight boron, from about 1% to 2% by weight silicon, up to about 1% by weight manganese, and up to about 0.5% by weight combined carbon.

The first mentioned ferrous alloy may be primarily employed for its hardness characteristics whereas the last mentioned nickel-cobalt alloy possesses superior corrosion resistance and is readily machinable.

The metallic composition for forming the wear-resistant alloy is inserted within the tubular body 11 and the body rotated slowly in a furnace to melt the metallic composition, spun at high speed to centrifugally distribute the molten composition throughout the interior of the body including the volume defined by the walls of the notches 12 and 13, and thereafter slowly water cooled to solidify the molten metal and form the desired wear-resistant metallic lining. The lining 16 thus produced may have any desired thickness, usually from about $\frac{1}{16}$ to $\frac{1}{8}$ inch, has a generally cylindrical configuration and includes a pair of spaced ribs 17 extending lengthwise of and inset within the walls of the body 11.

The body 11 is thereafter longitudinally milled, e.g., along the axis 18 shown in FIGURE 1, to remove a portion of the walls of the body adjacent the wall surfaces 15 and 15' thereof abutting the spaced ribs 17.

The intermediate wall section 18 between the ribs 17 of the tubular body 11 is thereafter removed, the edges of the body segment thus produced comprising a continuous surface of the wear-resistant material defined by a pair of surfaces 19 and 21 (see FIGURES 2, 2A). As most clearly illustrated in FIGURE 2A, the surface 19 is defined in part by the continuous cylindrical layer 16 and in part by a shoulder 22 remaining after milling of the rib 17. The shoulder 22 and the corresponding shoulder portion of surface 21 provide a continuous juncture surface constituted of the wear-resistant metallic lining material which is thereafter welded, as at 23 and 23' (FIGURE 2) to an identically formed tubular segment 11'.

The surfaces 19 and 21 of the segment 11 are disposed in adjacent aligned relationship with corresponding surfaces 19' and 21' of the mating segment 11' in order that, after welding at 23 and 23', a central longitudinally extending opening or passageway 24 is produced whose laterally extending juncture surfaces, defined by the shoulder portions of surfaces 19, 19' and 21, 21' are entirely constituted of the wear-resistant lining material. Each of such portions, it will be noted, defines an angle beta ($\beta$) of from about 45 to 60 degrees with respect to a radius of the segment 11 or 11' intersecting its outer edge.

The finished extruder liner 25 shown in FIGURE 2 thus may be produced with a central passageway 24 having any suitable lateral dimension for particular installations employing any desired screw configuration or utilizing varying thermoplastic materials to be extruded. The juncture surfaces between the welded segments 11 and 11' of the liner define a relatively planar apex construction providing superior strength when subjected to the pressure of the material extruded from one to the other of the liner segments.

In contrast thereto, and as illustrated in FIGURE 3, prior extruder liner constructions 25a involve welding (at 23a) a pair of tubular segments 11a and 11a' at the intersection of the wear-resistant linings 16a and 16a' thereof. The segment intersections are defined by V-shaped apices 26 and 27 formed between the respective linings of the liner segments. Since the layers 16a and 16a' are relatively thin as compared with the thickness of the tubular segments 11a and 11a', the longitudinal opening 24a defined therebetween is more restricted than the common cross-section of segments 11a and 11a'. Moreover, the V-shaped apices 26 and 27 are subject to breakage and fracture when subjected to relatively high pressures during extrusion.

The present invention thus provides a method for producing a liner for a double barrel extruder, and tubular bodies useful for the formation thereof, as well as such articles themselves, which are markedly superior to previously known extruder liner constructions.

Since certain changes may be made in carrying out the above method and in the resulting articles without departing from the scope of the invention, it is intended that the preceding description be interpreted as illustrative only and not in a limiting sense.

The embodiments of the invention in which an exclusive privilege or property is claimed are defined as follows:

1. A liner for a double-barrel extruder comprising a pair of parallel hollow tubular segments welded together so as to form parallel cylindrical passageways with a central longitudinal passageway therebetween, each of said segments comprising a metallic body lined on its inside walls with a wear-resistant metallic layer having generally cylindrical configuration and including a pair of spaced, longitudinally extending shoulders positioned adjacent said central longitudinal passageway, the shoulders of the respective tubular segments being aligned with and welded to one another, thereby providing relatively wide juncture surfaces constituted of said wear-resistant metallic lining material, defining said central longitudinal passageway.

2. The liner for a double-barrel extruder as defined in claim 1, in which the shoulders of each tubular segment of said liner are so spaced that the outer edges of said shoulders are included within an arc of from 45 to 60 degrees radially through the cross-section of each said tubular segment, and in which each of said shoulders defines an angle of from 45 to 60 degrees with respect to a radius of the corresponding tubular segment intersecting the outer edge of said shoulder.

3. The liner for a double-barrel extruder as defined in claim 1, in which each of said parallel tubular segments is constituted of a ferrous metal and in which the wear-resistant metallic lining of each said segment is constituted of a material selected from the group consisting of (1) a ferous alloy consisting principally of iron and containing from 2.5% to 6% nickel, from 2% to 4% combined carbon, from 0.2% to 2.5% boron, up to 2.5% silicon, up to 0.1% sulfur and up to 0.3% phosphorus; and (2) a nickel-cobalt alloy of from 40% to 45% nickel, from 40% to 45% cobalt, from 6% to 8% chromium, from 3% to 4% boron, from 1% to 2% silicon, up to 1% manganese and up to 0.5% combined carbon, all percentages being given by weight.

References Cited by the Examiner

UNITED STATES PATENTS

| | | | |
|---|---|---|---|
| 2,433,936 | 1/1948 | Tornberg | 18—12 |
| 2,495,241 | 1/1950 | Eaby | 18 |
| 2,507,347 | 5/1950 | Myers | 22—200.5 |
| 2,639,464 | 5/1953 | Magerjurth | 18—12 |
| 2,681,485 | 6/1954 | Smith | 22—200.5 |
| 2,752,633 | 7/1956 | Wertzel. | |
| 3,010,151 | 11/1961 | Dickinson et al. | 18—12 |
| 3,055,074 | 9/1962 | Garvey | 18—12 X |

WILLIAM J. STEPHENSON, *Primary Examiner.*
SPENCER J. OVERHOLSER, *Examiner.*
L. S. SQUIRES, *Assistant Examiner.*